US012066742B2

(12) United States Patent
Mori et al.

(10) Patent No.: US 12,066,742 B2
(45) Date of Patent: Aug. 20, 2024

(54) BLOCKING MECHANISM OF PRIVACY PROTECTION SHUTTER FOR CAMERA OF ELECTRONIC DEVICE

(71) Applicant: Panasonic Intellectual Property Management Co., Ltd., Osaka (JP)

(72) Inventors: Takeshi Mori, Osaka (JP); Yoshiyuki Harato, Osaka (JP); Ryota Morikawa, Osaka (JP); Ryo Yonezawa, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 89 days.

(21) Appl. No.: 17/885,897

(22) Filed: Aug. 11, 2022

(65) Prior Publication Data
US 2022/0382130 A1 Dec. 1, 2022

Related U.S. Application Data

(63) Continuation of application No. PCT/JP2021/005917, filed on Feb. 17, 2021.

(30) Foreign Application Priority Data

Feb. 17, 2020 (JP) .................. 2020-024449

(51) Int. Cl.
G03B 11/04 (2021.01)
(52) U.S. Cl.
CPC .................. G03B 11/043 (2013.01)
(58) Field of Classification Search
CPC .................................................. G03B 11/043
See application file for complete search history.

(56) References Cited

U.S. PATENT DOCUMENTS

| 4,486,084 | A | * | 12/1984 | Sato | ......................... | G03B 9/22 |
| | | | | | | 396/510 |
| 5,953,048 | A | | 9/1999 | Mikami et al. | | |
| 9,313,381 | B2 | * | 4/2016 | Kim | ....................... | H04N 23/50 |
| 10,481,469 | B2 | * | 11/2019 | Chen | ..................... | G06F 1/1605 |

(Continued)

FOREIGN PATENT DOCUMENTS

| CN | 206962947 U | 2/2018 |
| JP | H08-317266 A | 11/1996 |

(Continued)

OTHER PUBLICATIONS

International Search Report for corresponding Application No. PCT/JP2021/005917, mailed May 11, 2021.

(Continued)

*Primary Examiner* — Leon W Rhodes, Jr.
(74) *Attorney, Agent, or Firm* — Renner, Otto, Boisselle & Sklar, LLP

(57) ABSTRACT

A blocking mechanism of a privacy protection shutter for a camera is provided on an outer edge portion of a display of an electronic device. The privacy protection shutter includes a rotation pivot with which the privacy protection shutter is rotatable; a blocking portion that covers a lens of the camera to disable the camera to image at a block position; and an operation portion configured to cause the privacy protection shutter to rotate with the rotation pivot so as to move the blocking portion between the block position and an open position at which the lens is not covered by the blocking portion.

6 Claims, 6 Drawing Sheets

(56) References Cited

U.S. PATENT DOCUMENTS

| | | | |
|---|---|---|---|
| 10,887,763 B2* | 1/2021 | Yang | .................. H04N 23/73 |
| 2004/0174430 A1 | 9/2004 | Sawahara et al. | |
| 2007/0261711 A1 | 11/2007 | Fagrenius et al. | |
| 2011/0182029 A1 | 7/2011 | Wu et al. | |
| 2018/0059510 A1 | 3/2018 | Gustaveson, II | |
| 2019/0033686 A1 | 1/2019 | Kinoshita et al. | |
| 2019/0246014 A1* | 8/2019 | Huang | ............... E05D 15/0621 |
| 2019/0369462 A1 | 12/2019 | Krause | |
| 2020/0371406 A1 | 11/2020 | Hung | |

FOREIGN PATENT DOCUMENTS

| | | |
|---|---|---|
| JP | 2003-125051 A | 4/2003 |
| JP | 2004-274777 A | 9/2004 |
| JP | 2009-537855 A | 10/2009 |
| JP | 3170619 U | 8/2011 |
| JP | 2019-028157 A | 2/2019 |
| TW | M583955 U | 9/2019 |

OTHER PUBLICATIONS

Office Action for corresponding Japanese Application No. 2022-501933 issued on May 9, 2023 and its English translation.
Office Action for corresponding Japanese Application No. 2022-501933 dated Aug. 22, 2023 and its English Machine Translation.
International Preliminary Report on Patentability for corresponding Application No. PCT/JP2021/005917, mailed Sep. 1, 2022, English translation.

* cited by examiner

BLOCKING MECHANISM OF PRIVACY PROTECTION SHUTTER FOR CAMERA OF ELECTRONIC DEVICE

CROSS REFERENCE TO RELATED APPLICATIONS

The present application is a continuation of PCT/JP2021/005917 filed on Feb. 17, 2021, which claims priority to Japanese Patent Application No. 2020-024449, filed on Feb. 17, 2020, the entire contents of each of which are incorporated herein by reference.

BACKGROUND

1. Technical Field

The present disclosure relates to a blocking mechanism of a privacy protection shutter for a camera of an electronic device.

2. Related Art

Some electronic devices, particularly, laptop personal computers (laptop PCs) and tablet personal computers (tablet PCs) have a configuration in which a camera is incorporated as shown in, for example JP 2004-274777 A, JP 2003-125051 A, JP 2009-537855 A. In such electronic devices with a built-in camera, it is possible to perform a so-called video call, a web meeting, or the like while watching the other party's face through an analog line, a digital line, an Internet line, or the like.

SUMMARY

From the viewpoint of personal privacy protection, electronic devices having a built-in camera need to be configured as follows. There is provided a mechanism that can block a camera lens, and there is also provided a mechanism that indicates, when the camera lens is blocked, that the camera is in a blocked state in which the camera of the electronic device cannot image.

In order to provide an electronic device with a mechanism that can block a camera lens, and to provided also a mechanism that displays that the camera lens is blocked, it is an important issue to secure an installation space for the mechanisms, in the field of electronic devices where devices are required to be smaller and thinner.

An object of the present disclosure is to provide a blocking mechanism of a privacy protection shutter for a camera that occupies a small installation space in an electronic device incorporating the camera, can easily and reliably bring the camera into a blocked state, and enables a user to reliably recognize the blocked state.

A blocking mechanism of a privacy protection shutter for a camera according to the present disclosure is provided on an outer edge portion of a display of an electronic device. The privacy protection shutter includes a rotation pivot with which the privacy protection shutter is rotatable; a blocking portion that covers a lens of the camera to disable the camera to image at a block position; and an operation portion configured to cause the privacy protection shutter to rotate with the rotation pivot so as to move the blocking portion between the block position and an open position at which the lens is not covered by the blocking portion.

The present disclosure makes it possible easily and reliably to bring a camera in a blocked state in a small installation space in an electronic device incorporating the camera, and enables a user to recognize the blocked state.

DETAILED DESCRIPTION OF EMBODIMENTS

Figure 1:
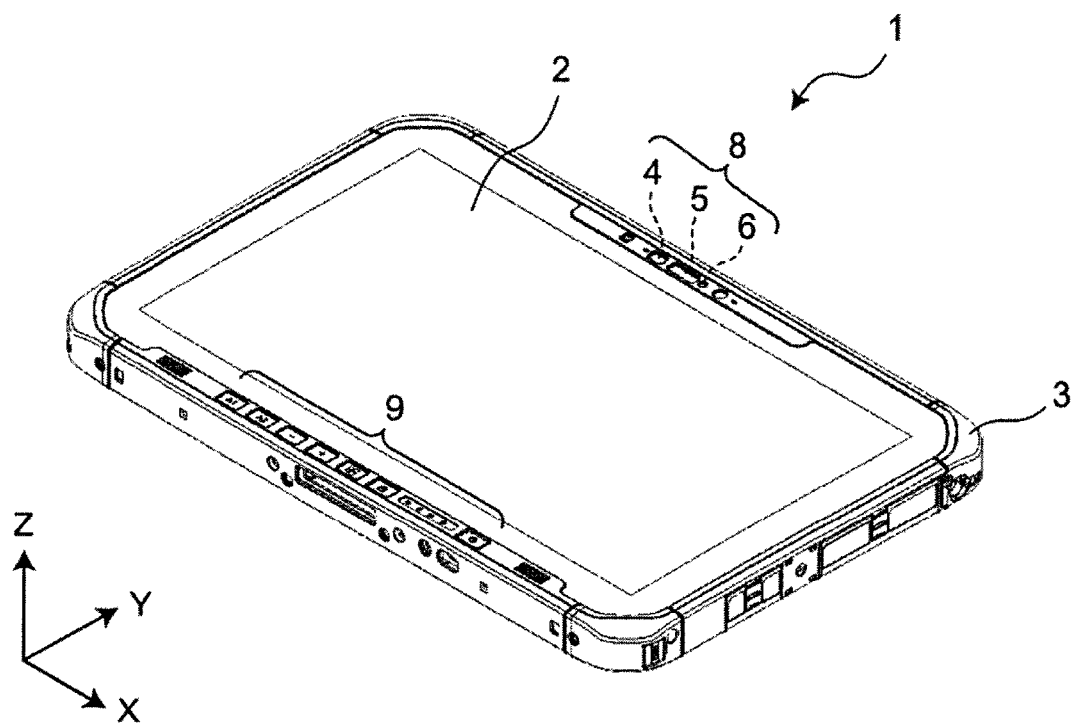
FIG. 1 is a perspective view illustrating an outer appearance of an electronic device of a first embodiment according to the present disclosure.

Hereinafter, a preferred embodiment will be described in detail with reference to the drawings as appropriate. However, in the description of the embodiment, unnecessarily detailed description may be omitted. For example, detailed description of already well-known matters and repeated description of substantially the same configuration may be omitted. This is to prevent the following description from being unnecessarily redundant and to allow a person skilled in the art to easily understand the present disclosure.

As a specific embodiment of a blocking mechanism of a privacy protection shutter for a camera of an electronic device of the present disclosure, a blocking mechanism for a privacy protection shutter for a camera in a tablet personal computer (tablet PC) will be described with reference to the accompanying drawings. The blocking mechanism of the privacy protection shutter for a camera of the present disclosure is not limited to the configuration of the blocking mechanism of the camera privacy protection shutter in the tablet PC described in the following embodiment, and includes a configuration of a blocking mechanism of a privacy protection shutter for a camera of an electronic device based on the technology equivalent to a technical idea having the technical features described in the following embodiment.

Note that the inventor or inventors provide the accompanying drawings and the following description for those skilled in the art to fully understand the present disclosure and the drawings, and the description are not intended to limit the subject matters of the claims.

Numerical values, shapes, configurations, steps (procedures, modes), orders of steps, and the like shown in the following embodiment are merely examples, and the present invention is not limited to the contents of the present disclosure. Among the components in the following embodiment, the components that are not described in the independent claim indicating the highest concept are described as optional components. Note that, in the embodiment, elements having similar functions are assigned the same reference numerals, and description thereof may be omitted. In addition, for easy understanding, the drawings mainly illustrate each component schematically.

First, various aspects in the blocking mechanism of the privacy protection shutter for a camera of an electronic device of the present disclosure will be described as examples.

A blocking mechanism of a privacy protection shutter for a camera according to the first aspect of the present disclosure, is provided on an outer edge portion of a display of an electronic device. The privacy protection shutter includes: a rotation pivot with which the privacy protection shutter is rotatable; a blocking portion that covers a lens of the camera to disable the camera to image at a block position; and an operation portion configured to cause the privacy protection shutter to rotate with the rotation pivot so as to move the blocking portion between the block position and an open position at which the lens is not covered by the blocking portion.

The blocking mechanism according to the second aspect of the present disclosure, in the first aspect, wherein the privacy protection shutter is disposed in the outer edge portion of the display and has an elongated shape, the rotation pivot is disposed at an end on a first side in a longitudinal direction of the privacy protection shutter, the blocking portion is disposed on a second side in the longitudinal direction of the privacy protection shutter, and the operation portion is disposed between the rotation pivot and the blocking portion.

The blocking mechanism according to the third aspect of the present disclosure, in the first aspect, wherein a plurality of devices including the camera are juxtaposed on the outer edge portion of the display of the electronic device, and the blocking portion simultaneously covers the plurality of devices at the block position.

The blocking mechanism according to the fourth aspect of the present disclosure, in the first aspect, wherein the operation portion includes an operation protrusion provided to protrude from an operation window formed on the outer edge portion of the display of the electronic device, and in a blocked state in which the blocking portion is positioned at the block position, the operation portion displays the blocked state on the operation window.

The blocking mechanism according to the fifth aspect of the present disclosure, in the first aspect, wherein the privacy protection shutter has a fitting-in portion that is to be held by a main body of the electronic device to maintain a blocked state in which the blocking portion is positioned at the block position.

The blocking mechanism according the sixth aspect of the present disclosure, in the first aspect, wherein the privacy protection shutter has a rib and a thick portion that increase rigidity.

First Embodiment

Hereinafter, with reference to the drawings, a description will be given on a blocking mechanism of a privacy protection shutter for a camera of an electronic device of the first embodiment according to the present disclosure.

[Overall Configuration]

Figure 2:
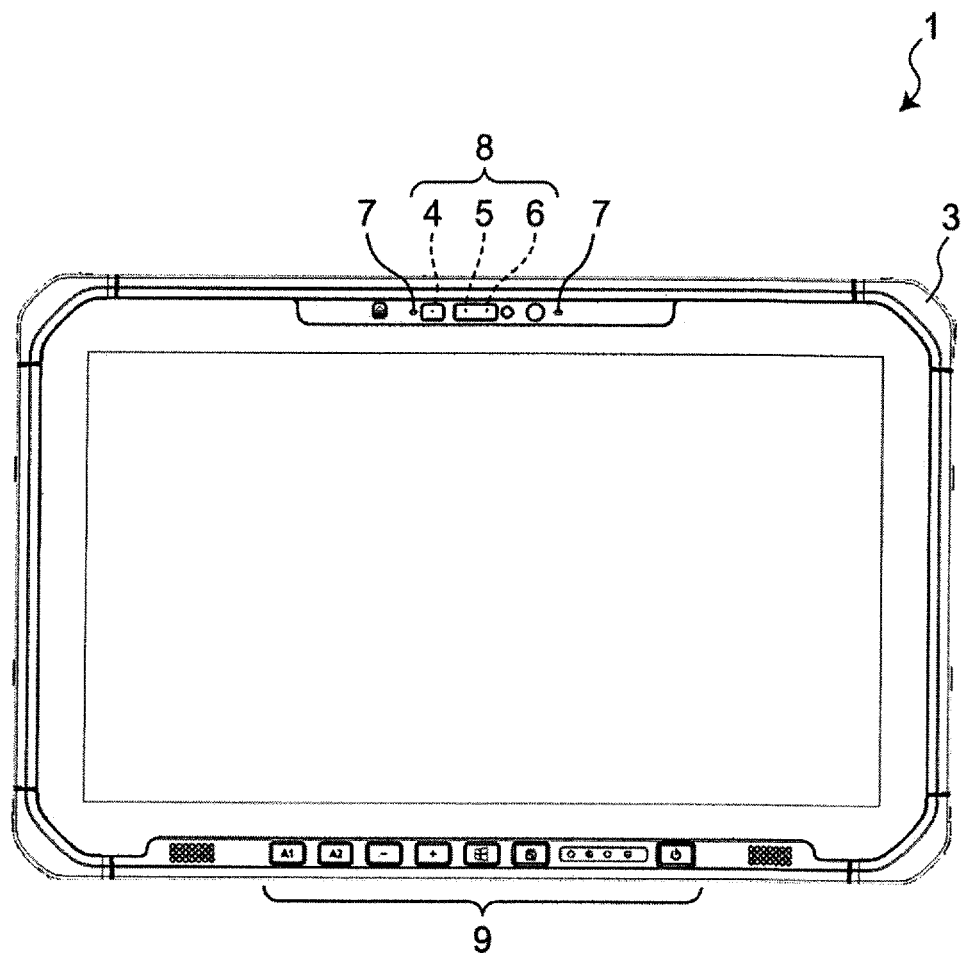
FIG. 2 is a plan view of the electronic device of the first embodiment.

FIG. 1 is a perspective view illustrating an outer appearance of a tablet-type personal computer (PC) 1 as an electronic device according to the first embodiment. FIG. 2 is a plan view (top view) of a tablet-type PC 1 of the first embodiment. In FIGS. 1 and 2, an X-axis, a Y-axis, and a Z-axis orthogonal to each other are illustrated for convenience, and a longitudinal direction (X direction), a width direction (Y direction), and a thickness direction (Z direction) in the tablet-type PC 1 of the first embodiment will be respectively described using the X-axis, the Y-axis, and the Z-axis. Further, a description will be given, assuming that the Z direction side of the PC 1 is the front surface side (upper side), the Y direction side is the back surface side, and the X direction side is the right side.

The tablet-type PC 1 of the first embodiment has a configuration that provides a main function as a tablet-type personal computer. In addition, the PC 1 is detachably provided with various extension devices that provide extension functions.

The PC 1 of the first embodiment is provided with a display 2 on one of the main surfaces that is the front surface. The display 2 is configured with, for example, a liquid crystal display and has a function as a pointing device that outputs a signal indicating a touched position. In addition, the PC 1 includes therein a controller, a storage, various input/output interface components, and the like. The controller includes, for example, a central processing unit (CPU), a micro processor unit (MPU), or the like. The controller performs arithmetic processing using various data based on a program read out from the storage, thereby realizing various functions in the PC 1. The storage is configured with, for example, a random access memory (RAM), a read-only memory (ROM), a hard disc drive (HDD), a solid state drive (SSD), and the like. The storage stores programs including an operating system (OS) and various application programs, and stores various data. The input/output interface components are an interface for transmitting and receiving various signals to and from the extension device.

The PC 1 of the first embodiment has such a configuration that the PC 1 can be used even in harsh environments for electronic devices such as outdoor sites and factories. For example, outer shell portion 3 as a part of a casing is formed on a side outer peripheral portion of the PC 1. The outer shell portion 3 is configured to have functions such as shock absorption, dust-proofness, and drip-proofness.

On the outer shell portion 3 that is the side outer peripheral portion of PC 1 of the first embodiment, there are provided various connection terminals for connection to external devices. Examples of the connection terminals include an extension bus connector, an external display connector, a universal system bus (USB) connector, a local area network (LAN) connector, a memory card slot, and an input/output terminal such as an audio output terminal for an electric signal.

Further, in the PC 1 of the first embodiment, on the back surface side of the front surface side of the outer shell portion 3 surrounding the display 2 on the main surface, there are provided a face authentication camera 4, an infrared (IR) lamp 5, a front camera 6, a microphone 7, and the like. In addition, on the front side of the front surface side of the outer shell portion 3 (the lower side on the paper surface of FIG. 2), there is provided an operation setting unit 9 including a power button and a display operation button.

The PC 1 of the first embodiment is configured such that a battery pack is mounted on the rear surface side of the PC 1 and such that a rear camera, a speaker, and the like are provided.

In the PC 1 of the first embodiment configured as described above, from the viewpoint of privacy protection, a privacy protection shutter 10 is provided over a camera-related portion 8 including the face authentication camera 4, the infrared (IR) lamp 5, the front camera 6, and the like. The privacy protection shutter 10 has the following functions: a function of covering camera lenses so that the face authentication camera 4 and the front camera 6 cannot image; and a function of displaying that the face authentication camera 4 and the front camera 6 are in a blocked state in which no image is being taken. The blocking mechanism of the privacy protection shutter 10 is provided on an outer edge portion that is an outer side area of the display 2.

Figure 3:
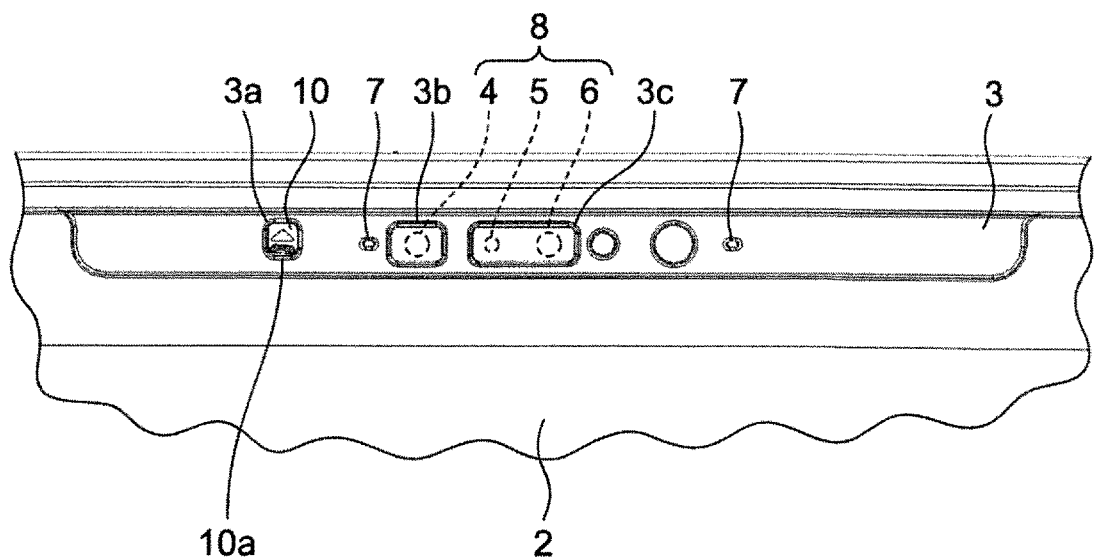
FIG. 3 is an enlarged view illustrating the vicinity of a camera-related portion in the electronic device of the first embodiment.

FIG. 3 is an enlarged view illustrating the vicinity of the camera-related portion 8 formed on the back surface side of the front surface side of the outer shell portion 3 in the PC 1 of the first preferred embodiment. As illustrated in the enlarged view of FIG. 3, the outer shell portion 3 is provided with an operation window 3a for operating the privacy protection shutter 10, a first window 3b for the face authentication camera 4, a second window 3c for the front camera 6, and a plurality of windows for other components such as the microphone, a light-emitting diode (LED) indicator, and an illuminance sensor. The camera-related portion 8 illustrated in FIG. 3 is in a blocked state in which the face authentication camera 4, the IR lamp 5, and the front camera 6 are covered by the privacy protection shutter 10. As illustrated in FIG. 3, in the blocked state, the operation window 3a displays an arrow (Δ) pointing toward the back surface side (the upper side on the paper surface of FIG. 3), and an operation protrusion 10a that is an operation portion of the privacy protection shutter 10 is provided to protrude. At this time, the operation protrusion 10a, which is an operation portion, is disposed on the front side (the lower side on the paper surface of FIG. 3) in the operation window 3a. That is, when the arrow (Δ) is displayed in the operation window 3a and is disposed on the front side of the operation window 3a, it indicates the blocked state. In the present embodiment, the arrow (Δ) is used to display. However, the arrow (Δ) is not limitative in the present disclosure, and it is possible to use any object that can be reliably recognized by a human who can be a subject in front of the PC 1. A colored mark, a character, a symbol, or the like may be used to display.

Figure 4:
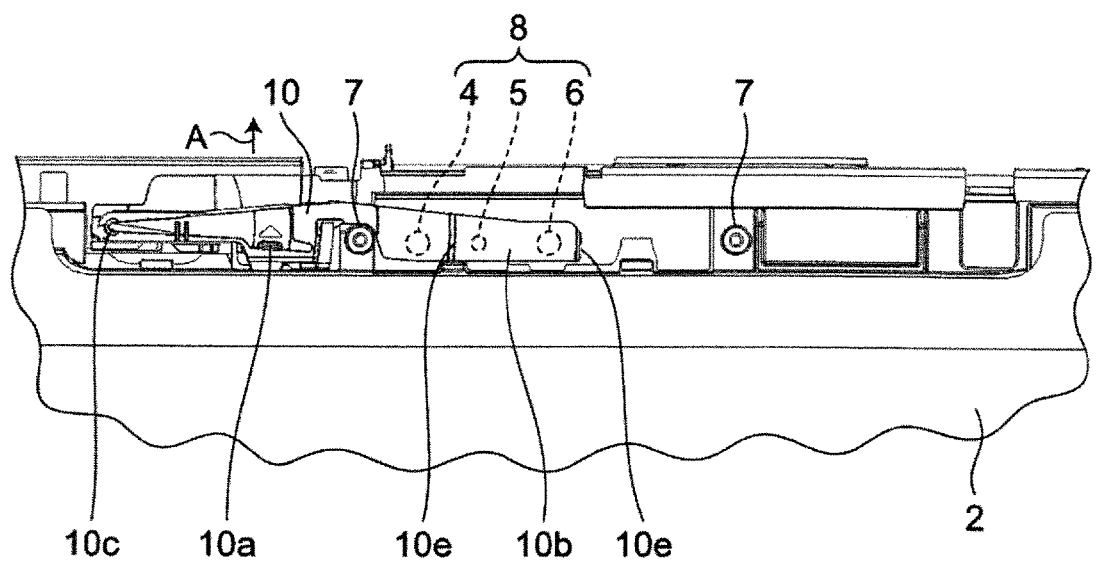
FIG. 4 is an enlarged view of a part of the electronic device of the first embodiment illustrated in FIG. 3.
Figure 5:
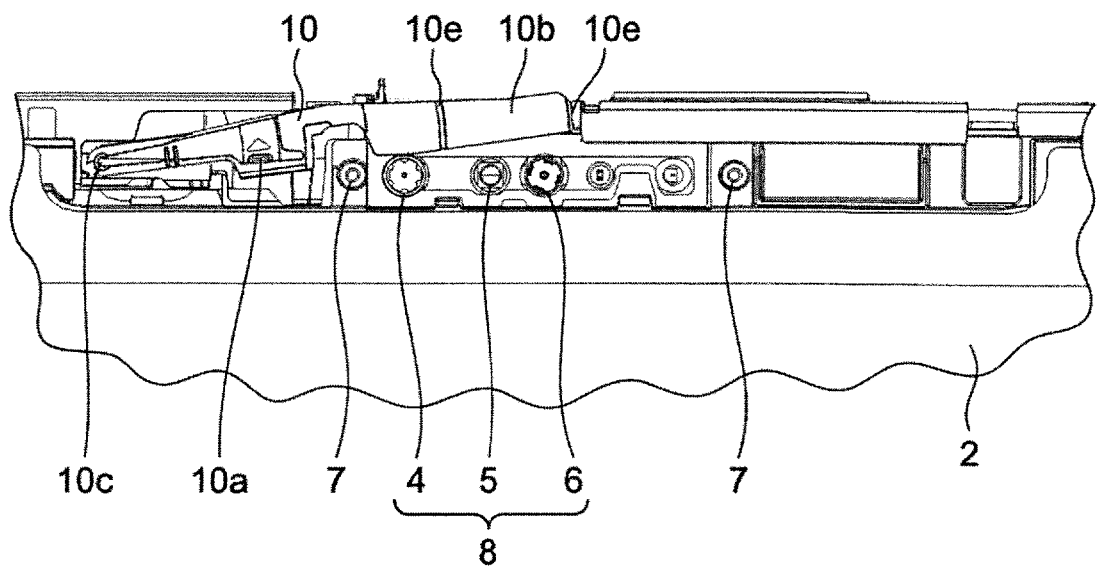
FIG. 5 is a diagram illustrating an open state which is switched from a blocked state illustrated in FIG. 4 and in which imaging can be performed.

FIG. 4 is an enlarged view of the PC 1 of the first embodiment illustrated in FIG. 3 but with the outer shell portion 3 removed, and illustrates a state (blocked state, block position) in which the face authentication camera 4, the IR lamp 5, and the front camera 6 are blocked by the privacy protection shutter 10. FIG. 5 illustrates an open state (open position) in which the privacy protection shutter 10 is pivoted from the blocked state illustrated in FIG. 4 and imaging can be performed using the face authentication camera 4, the IR lamp 5, and the front camera 6.

As illustrated in the blocked state of FIG. 4 and the open state of FIG. 5, the privacy protection shutter 10 is configured to pivot with the pivoting shaft 10c (rotation pivot) as the center of pivot. The privacy protection shutter 10 is configured as follows. When a user moves the operation protrusion 10a in the operation window 3a to the back surface side (in the direction of arrow A in FIG. 4), the privacy protection shutter 10 rotates to allow the face authentication camera 4, the IR lamp 5, and the front camera 6 to come out from the windows, thereby enabling imaging.

Figure 6:
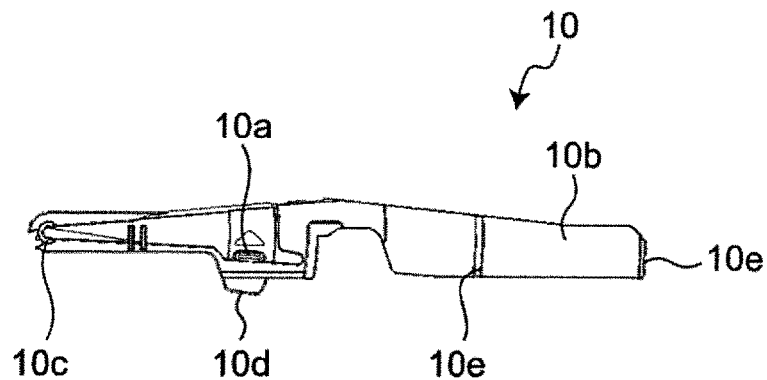
FIG. 6 is a plan view illustrating a privacy protection shutter in the first embodiment.
Figure 7:
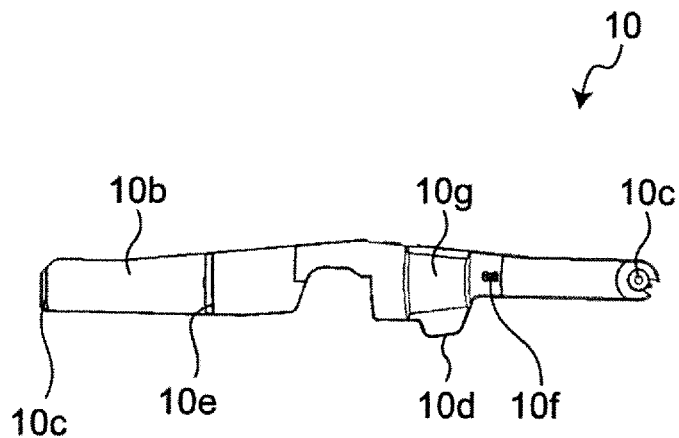
FIG. 7 is a rear view illustrating the privacy protection shutter in the first embodiment.

FIGS. 6 and 7 are respectively a plan view (front surface side) and a rear view (rear surface side) illustrating only the privacy protection shutter 10. The privacy protection shutter 10 has an elongated shape. On one end of the privacy protection shutter 10 in the longitudinal direction, there is disposed the pivoting shaft 10c, and on the other side in the longitudinal direction, there is formed a blocking area of a blocking portion 10b. As illustrated in the plan view of FIG. 6, on the front surface side of the privacy protection shutter 10, there is located the operation protrusion 10a, and on the back surface side (the upper side on the paper surface of FIG. 6) of the operation protrusion 10a, there is displayed the arrow (Δ). At the left end of the privacy protection shutter 10, there is formed the pivoting shaft 10c serving as a pivot center. That is, the pivoting shaft 10c is pivotably fixed to a main body of the PC 1. In the privacy protection shutter 10, on the right end side, which is the opposite side to the pivoting shaft 10c, there is formed the blocking portion 10b, which is an area capable of blocking the face authentication camera 4, the IR lamp 5, and the front camera 6. The operation protrusion 10a is disposed between the pivoting shaft 10c and the blocking portion 10b of the privacy protection shutter 10 and is disposed at a position close to the pivoting shaft 10c. In the present embodiment, the operation protrusion 10a is formed at a position that is closer to the pivoting shaft 10c and is within a range of 30% to 40% of the entire length of the privacy protection shutter 10 in the longitudinal direction. Therefore, with respect to the privacy protection shutter 10, by moving the operation protrusion 10a close to the pivoting shaft 10c to the back surface side (upper side) or the front side (lower side), the blocking portion 10b on the right end side, which is the opposite side to the pivoting shaft 10c, moves largely.

The privacy protection shutter 10 is a plate-shaped member, and a plurality of ribs 10e are formed in order to secure rigidity of the privacy protection shutter 10. In addition, as illustrated in FIG. 6, on the privacy protection shutter 10 there is formed a fitting-in portion 10d on the front side (the lower side of the paper surface in FIG. 6) of the operation protrusion 10a. The fitting-in portion 10d has a shape in which the thickness is made thin on the tip end (the lower end) and gradually becomes thicker. The fitting-in portion 10d is fitted into and held in a recess (not shown) formed in a main body of the PC 1 in the blocked state, so that the privacy protection shutter 10 can be reliably maintained in the blocked state.

As illustrated in FIG. 7, a click protrusion 10f is formed on the back surface of the privacy protection shutter 10. The click protrusion 10f is configured to come into contact with a protrusion (not shown) provided in the vicinity of the position of the main body of the PC 1 that the click protrusion faces, and the click protrusion 10f generates a click sound when passing over the protrusion. Therefore, the user can confirm the operation state by hearing a click sound and feeling a small impact on the finger when the user operates and move the operation protrusion 10a of the privacy protection shutter 10 from the blocked state to the open state or from the open state to the blocked state.

Figure 8:
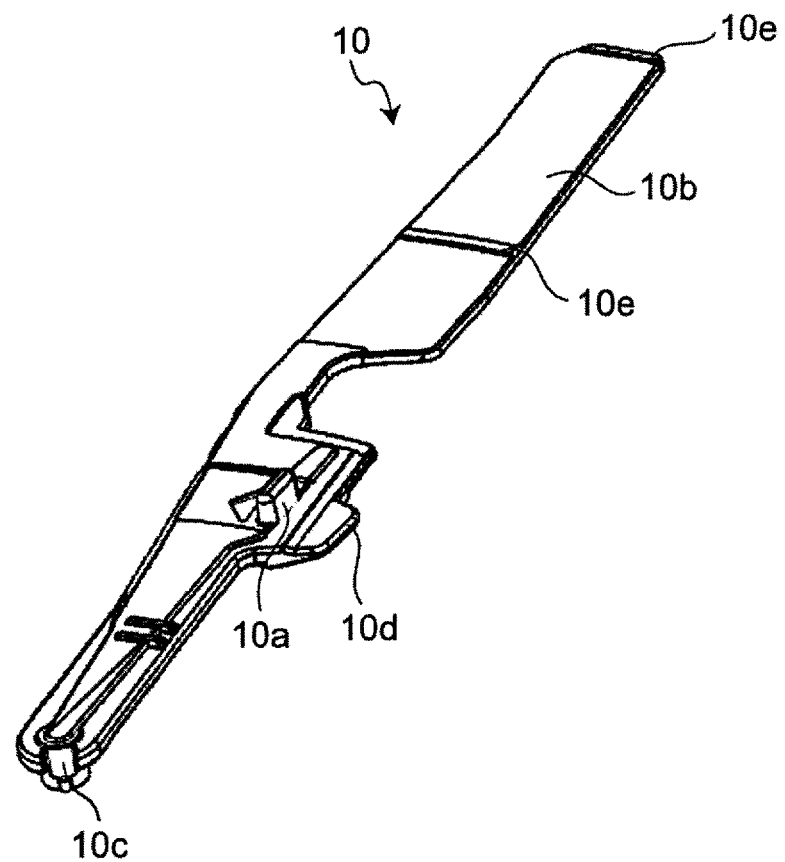
FIG. 8 is a perspective view mainly illustrating the front surface side of the privacy protection shutter in the first embodiment.
Figure 9:
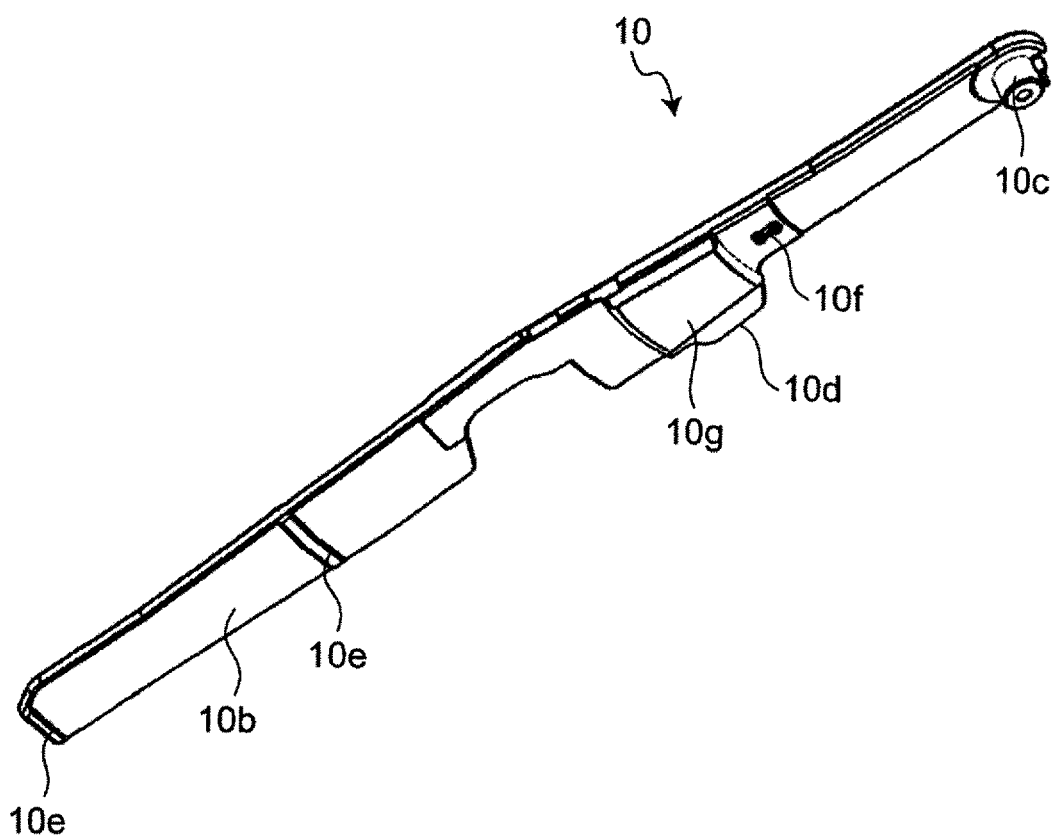
FIG. 9 is a perspective view mainly illustrating the rear surface side of the privacy protection shutter in the first embodiment.

FIGS. 8 and 9 are perspective views of only the privacy protection shutter 10. FIG. 8 mainly illustrates the front surface side, and FIG. 9 mainly illustrates the rear surface side. As illustrated in FIGS. 8 and 9, the privacy protection shutter 10 has a configuration such that the privacy protection shutter 10 has the plurality of ribs 10e formed thereon and has different thicknesses. In particular, the rear surface side, on which the operation protrusion 10a is formed, has a large thickness, and a thick portion 10g is formed on the rear surface side. Since the plurality of ribs 10e, the thick portion 10g, and the like are formed as described above, a rigidity of the privacy protection shutter 10 is enhanced. In addition, the shape (including the thickness) of the privacy protection shutter 10 according to the present embodiment is specified, considering arrangement positions of various devices (for example, the microphone and the like) provided in the installation space in the PC 1. For example, the privacy protection shutter 10 includes a notch shape so that the privacy protection shutter 10 does not block the microphone 7 in the blocked state.

[Effect and the Like]

The blocking mechanism of the privacy protection shutter for a camera of an electronic device of the first embodiment configured as described above occupies a small installation space and can easily and reliably bring the camera into the blocked state and enables a user to reliably recognize the blocked state. The blocking mechanism of the camera privacy protection shutter of the first embodiment has the following configuration. In order to simultaneously block lenses of a plurality of juxtaposed cameras (4 and 6), there is provided a privacy protection shutter (10) for a camera that has a pivoting shaft (10*c*) in a direction of the juxtaposition. A blocking portion (10*b*) is provided on the opposite side to the pivoting shaft (10*c*) of the privacy protection shutter (10) for a camera to simultaneously block the plurality of juxtaposed cameras (4 and 6). An operation portion (operation protrusion: 10*a*) for causing the privacy protection shutter (10) for a camera to pivot is provided between the pivoting shaft (10*c*) and the blocking portion (10*b*). In particular, the operation portion (operation protrusion: 10*a*) is provided closer to the position of the pivoting shaft (10*c*) than to an intermediate position between the pivoting shaft (10*c*) and the blocking portion (10*b*). As a result, a small movement of the operation portion (operation protrusion: 10*a*) causes the blocking portion (10*b*) to move largely, and it is therefore possible to simultaneously block the lenses of the plurality of juxtaposed cameras (4 and 6). Therefore, the present disclosure enables, in a camera-related portion and a blocking mechanism of a privacy protection shutter that are provided in a narrow space on the outer edge portion of the display of an electronic device, a single pivoting operation of the privacy protection shutter having a simple configuration to simultaneously bring a plurality of components into the blocked state.

Although the present disclosure has been described in the preferred embodiment with a certain degree of detail, this configuration is an example, and the disclosed content of the preferred embodiment should change details of the configuration. In the present disclosure, replacements, combinations, and changes of order of elements in the preferred embodiment can be made without departing from the claimed scope and spirit of the present disclosure.

In the above, the preferred embodiment is described as an example of the techniques in the present disclosure. For that purpose, the detailed description and the accompanying drawings have been disclosed. Therefore, the components described in the detailed description and the accompanying drawings may include components that are not essential for solving the problem. Therefore, it should not be immediately construed that those non-essential components are essential merely because they are described in the detailed description and the accompanying drawings.

Since the preferred embodiment described above is merely an example of the techniques in the present disclosure, various modifications, replacements, additions, omissions, and the like can be made in the scope of the claims or in an equivalent scope thereof.

The present disclosure is useful in various electronic devices including a camera because the present disclosure can reliably bring a camera included in an electronic device into the blocked state by a simple configuration and can enable a user to reliably recognize the blocked state.

What is claimed is:

1. An electronic device comprising:
   a casing;
   a display provided on a front surface of the casing;
   a camera provided in the casing between an outer edge portion of the casing and an outer edge portion of the display; and
   a privacy protection shutter for the camera provided in the casing between the outer edge portion of the casing and the outer edge portion of the display;
   the privacy protection shutter including:
      a rotation pivot with which the privacy protection shutter is rotatable;
      a blocking portion that covers a lens of the camera to disable the camera to image at a block position; and
      an operation portion configured to be actuated by a user to cause the privacy protection shutter to rotate with the rotation pivot so as to move the blocking portion between the block position and an open position at which the lens is not covered by the blocking portion,
   wherein the privacy protection shutter is an elongated plate-shaped member having a shape in which a longitudinal direction is longer than a width direction, the longitudinal direction being along the outer edge of the display, the width direction being from the outer edge of the display to the outer edge of the front surface, and
   the rotation pivot is disposed at a first end of the privacy protection shutter in the longitudinal direction, the blocking portion is disposed at a second end of the privacy protection shutter in the longitudinal direction, and the operation portion is disposed between the rotary pivot and the blocking portion.

2. The electronic device according to claim 1, wherein the open position of the blocking portion is closer to the outer edge of the front surface than the blocking position of the blocking portion.

3. The electronic device according to claim 1, wherein a plurality of devices including the camera are juxtaposed in the casing between the outer edge portion of the casing and the outer edge portion of the display, and
   the blocking portion simultaneously covers the plurality of devices at the block position.

4. The electronic device according to claim 1, wherein the operation portion includes an operation protrusion provided to protrude from an operation window formed on the front surface between the outer edge portion of the casing and the outer edge portion of the display, and
   in a blocked state in which the blocking portion is positioned at the block position, the operation portion displays the blocked state on the operation window.

5. The electronic device according to claim 1, wherein the privacy protection shutter has a fitting-in portion that is to be held by the casing of the electronic device to maintain a blocked state in which the blocking portion is positioned at the block position.

6. The electronic device according claim 1, wherein the privacy protection shutter has a rib and a thick portion that increase rigidity.

* * * * *